(12) United States Patent
Nodono et al.

(10) Patent No.: US 6,685,460 B2
(45) Date of Patent: Feb. 3, 2004

(54) EXTRUSION MOLDING MACHINE

(75) Inventors: Mitsunori Nodono, Ibaraki (JP); Ryuma Kuroda, Ibaraki (JP)

(73) Assignee: Sumitomo Chemical Company, Ltd., Osaka (JP)

(*) Notice: Subject to any disclaimer, the term of this patent is extended or adjusted under 35 U.S.C. 154(b) by 315 days.

(21) Appl. No.: 09/866,880

(22) Filed: May 30, 2001

(65) Prior Publication Data

US 2002/0011688 A1 Jan. 31, 2002

(30) Foreign Application Priority Data

| Jun. 1, 2000 | (JP) | 2000-164230 |
| Oct. 31, 2000 | (JP) | 2000-332389 |
| Dec. 20, 2000 | (JP) | 2000-386994 |

(51) Int. Cl.$^7$ .............................. B29C 47/00
(52) U.S. Cl. ................... 425/380; 425/382.3
(58) Field of Search ............ 264/176.1; 425/380, 425/382.3

(56) References Cited

U.S. PATENT DOCUMENTS

| 3,600,918 | A | * | 8/1971 | Lemelson | 72/7.4 |
| 4,256,448 | A | * | 3/1981 | Carle | 425/367 |
| 4,304,539 | A | * | 12/1981 | Hagiwara et al. | 425/145 |
| 4,783,290 | A | * | 11/1988 | Simelunas | 264/39 |
| 4,859,166 | A | * | 8/1989 | Hamada et al. | 425/204 |
| 4,963,309 | A | * | 10/1990 | Gohlisch et al. | 264/175 |
| 5,122,049 | A | * | 6/1992 | Baumgarten | 425/188 |
| 5,186,960 | A | * | 2/1993 | Walsh, Jr. | 425/376.1 |
| 5,453,238 | A | * | 9/1995 | Bardy | 264/174.11 |
| 5,607,703 | A | * | 3/1997 | Sakai et al. | 425/145 |
| 6,306,323 | B1 | * | 10/2001 | Chu et al. | 264/105 |

FOREIGN PATENT DOCUMENTS

| JP | 6-166085 A | 6/1994 |

* cited by examiner

Primary Examiner—Mark Eashoo
(74) Attorney, Agent, or Firm—Fitch, Even, Tabin & Flannery

(57) ABSTRACT

The present invention provides a molding extrusion machine comprising a pair of delivery rolls arranged forward continuously with a die attached to the end of an extruder by which a molten resin material is extruded through the die toward a rolling part between the delivery rolls and further extruded through a pair of the delivery rolls, wherein gas-sealing molds in intimate contact with both sides at least at the top of the die at the side of the discharge opening are provided to close openings in both sides of the rolling part so that supporting parts in both sides of a pair of the delivery rolls are formed into an air-tightness keeping part by said gas-sealing molds.

9 Claims, 11 Drawing Sheets

The rolling faces of a pair of the delivery rolls under a enlarged scale

EXTRUSION MOLDING MACHINE

BACKGROUND OF THE INVENTION

1. Field of the Invention

The present invention belongs to the technical field of extrusion molding and relates to an extrusion molding machine by which a molten resin material is extruded through a die by an extruder and further extruded through a pair of delivery rolls.

2. Description of the Related Art

As shown in FIG. 11, a molding part 610 in a conventional molding machine is provided with a pair of upper and lower delivery rolls 601 supported by a frame 605, and a rolling part 607 between this pair of delivery rolls 601 is arranged before a die 602 installed at the end of an extruding machine 4.

Upon extrusion of a molten resin material in a cylinder 42 by rotating a screw 41 in the extruder 4, the molten resin material is passed through a resin flow path 621 in the die 602 and extruded from the discharge opening at the end of the die 602, and by rotating a pair of the delivery rolls 601, the molten resin material extruded toward the rolling part 607 between the delivery rolls 601 is delivered from the delivery part 608 at the opposite side of the rolling part 607 to form a product sheet S. The molten resin material is molded in this manner into the product sheet S by the extrusion molding machine equipped with a pair of the delivery rolls 601.

As the molten resin material, various thermoplastic resins and rubber materials are used. A lubricant is added to this molten resin material to improve the releasability of the product sheet S from the delivery rolls 601, a foaming agent is added in foaming molding, and various additives are incorporated depending on molding processability and characteristics of moldings.

Since the rolling part 607 between a pair of the delivery rolls 601 is open, the molten resin material extruded from the die 602 is exposed immediately to atmospheric pressure. Accordingly, there Is a problem that a part of the compounding ingredients in this molten resin is diffused into the atmosphere.

For example, when a molten resin material containing a foaming agent is used in foaming molding, there is a problem that upon extrusion of the molten resin material containing a foaming agent from the die 602, the melting viscosity of the molten resin material is low so that the gas in the resin material cannot be maintained in the resin material, thus diffusing into the atmosphere, breaking bubbles and roughing the surface of the product to worsen the outward appearance.

Further, when highly volatile compounding ingredients are contained, a part of the volatile compounding ingredients is evaporated upon extrusion of the molten resin material from the die 602. If such evaporated volatile compounding ingredients are, for example, a lubricant added for improving releasability from the delivery rolls 601, the release of the product sheet S from the delivery rolls 601 is deteriorated to worsen the surface conditions of the delivered product sheet S.

SUMMARY OF THE INVENTION

The object of the present invention is to prevent diffusion etc. of compounding ingredients in a molten resin material upon extrusion of the molten resin material from a die in "a molding extrusion machine comprising a pair of delivery rolls arranged forward continuously with a die attached to the end of an extruder by which a molten resin material is extruded through the die toward a rolling part between the delivery rolls and further extruded through a pair of the delivery rolls".

The technical means taken for solving the problem described above are as follows:

"Gas-sealing molds in intimate contact with both sides at least at the top of the die at the side of the discharge opening are provided to close openings in both sides of the rolling part so that supporting parts in both sides of a pair of the delivery rolls are formed into an air-tightness keeping part by said gas-sealing molds."

The technical means described above act as follows.

The gas-sealing molds are provided in intimate contact with both sides at least at the top of the die at the side of the discharge opening thereby closing openings in both sides of the rolling part, so that the space in the rolling part between the delivery rolls is closed by the gas-sealing molds and the die. Further, the supporting parts for a pair of the delivery rolls are formed into an air-tightness keeping part by said gas-sealing molds, so that in both sides of the delivery rolls, the gas-sealing between the delivery roll and the gas-sealing mold is achieved by said gas-tightness keeping part.

Therefore, upon extrusion of the molten resin material out of the die, the rolling part is highly airtight to form a high-pressure zone kept at high pressure. Accordingly, the molten resin material extruded out of the die can be maintained at high pressure even in the rolling part.

Another technical means is "the die is intimately and externally fitted with gas-sealing molds being open forward, a pair of the delivery rolls is accommodated in the gas-sealing molds, and supporting parts in both sides of a pair of the delivery rolls are formed into an air-tightness keeping part by said gas-sealing molds."

In this case, a pair of the delivery rolls is accommodated in the gas-sealing molds with which the die is intimately and externally fitted, and thus the space in the rolling part between the delivery rolls is closed by the gas-sealing molds and the die. In this case too, the supporting portions in both sides of a pair of the delivery rolls are formed into a gas-tightness keeping portion, so that in both sides of the delivery rolls, the gas-sealing between the delivery roll and the gas-sealing mold is achieved by said gas-tightness keeping part. By this constitution, the space in the rolling part is rendered highly airtight.

In this case too, therefore, the molten resin material is extruded from the die thereby reducing the leakage, out of the highly airtight rolling part, of the air and volatile components and a foaming agent etc. for foaming molding, to achieve a high-pressure zone kept at atmospheric pressure or more. By this constitution, the molten resin material extruded from the die is pressurized at atmospheric pressure or more, even in the rolling part. That is, the molten resin material is kept at atmospheric pressure or more until it is formed into a product sheet by delivery with a pair of the delivery rolls.

Said gas-tightness keeping part is constituted by "interposing an O-ring in a freely rotating part between the rotating shaft of each of the delivery rolls and the gas-sealing mold."

In each of the technical means wherein "said gas-tightness keeping part comprises resin packing interposed inside of the O-ring", the gas sealability between the delivery roll and the gas-sealing mold can be further improved. In addition, even if a part of the molten resin material extruded from the die permeates into the supporting parts at both sides of the delivery rolls, the molten resin material is sealed by the resin packing thereby preventing the leakage of the molten resin material from the gas-sealing molds.

In each of the technical means wherein "said die is thinning toward its top along the rolling faces of the delivery rolls, and the top is inserted into the rolling part with a gap therebetween to prevent the top from contacting with the rolling face", the air-tightness of the space in the rolling part can be further improved by the thinning part of the die, and the maintenance of the high pressure in the rolling part as the high-pressure zone can be further improved.

In each of the technical means wherein "at least one member of the delivery roll, the die and the gas-sealing mold has a temperature-regulating function", not only the viscosity of the extruded molten resin material but also the surface temperature of the extruded molten resin material can be regulated thereby preventing disruption of foams more effectively, to provide a product with a good appearance.

In each of the technical means wherein "a pair of the delivery rolls is delivery rolls rotated by a rotation driving means connected to at least one of the delivery rolls, and the rotation of the delivery rolls is regulated by the rotation driving means to limit the discharge, from the delivery rolls, of the molten resin material extruded through the die", the amount of the molten resin material as the bank in the rolling part is increased and thus the pressure of the high-pressure zone can be maintained at higher pressure.

In each of the technical means wherein "the gap between the top of the die and the rolling face of the delivery roll is set to be an interval which permits the molten resin material extruded from the die to permeate into the gap and remain therein", the molten resin material having permeated into the gap prevents the leakage, through the gap, of the air and volatile components or a foaming agent etc. in foaming molding, thus further improving the air-tightness of the space in the rolling part.

In each of the technical means wherein "the gap between the top of the die and the rolling face of a pair of the delivery rolls is set to be an interval which is not greater than 4 mm", the remaining amount, being in trouble, of the melted resin material in the gap can be further reduced by setting the gap between the top of the die and the rolling face of a pair of the delivery rolls to be a relatively small clearance which is not greater than 4 mm. Thereby, rotating the rolls is conducted smoothly, and further turbulence of the molten resin material's streaming such as its counter-streaming into the gap is reduced.

In addition, it is preferable that the gap is set to be not greater than 3 mm. More preferred is not greater than 2 mm, further preferred is not greater than 1 mm. That is to say, the smaller a clearance in the gap becomes, the more the remaining amount of the molten resin material in the gap and the turbulence of the molten resin material is reduced.

As regards the above-described extrusion molding machine, in a case of forming molding, it is possible to manufacture products with a good appearance showing no uneven distribution of foams and uniform shape of foams in the products because the turbulence of the molten resin material's streaming caused by its counter-streaming into the gap is reduced.

In each of the technical means wherein "said die is thinning toward its top along the rolling faces of the delivery rolls, and the top is inserted into the rolling part with a gap therebetween to prevent the top from contacting with the rolling face", the molten resin material extruded through the die is immediately delivered by rotation of a pair of the delivery rolls because a discharge opening of the die is brought near to a rolling part between a pair of the delivery rolls. Due to that, the remaining amount, being in trouble, of the molten resin material in the gap and turbulence of the molten resin material's streaming into the gap caused by its counter-streaming into the gap are further reduced.

As described above, the melted resin material extruded toward the side of the rolling part as the high-pressure zone between the delivery rolls is kept at high pressure thereby preventing the diffusion etc., from the rolling part, of the compounding ingredients in the melted resin material.

Particularly in foaming molding, it is possible to control the diffusion, into the atmosphere, of the gas in the molten resin material in the rolling part, thus preventing occurrence of ruptured foams as a cause of an inferior appearance of the product.

In addition, when a volatile lubricant is contained in the molten resin material, the lubricant as a volatile component can be prevented from being evaporated in the rolling part, and thus reliably releasing the product sheet from the delivery rolls can be conducted.

Moreover, not only the remaining amount of the molten resin material in the gap between the top of the die and the rolling face of a pair of the delivery rolls but also turbulence of the molten resin material's streaming such as its counter-streaming into the gap is reduced, thereby delivery of products is conducted smoothly without any poor appearance. Particularly in forming molding, it is possible to manufacture products with a good appearance showing no uneven distribution of foams and uniform shape of foams in the products because the turbulence of the molten resin material's streaming caused by its counter-streaming into the gap is reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE INVENTION

Hereinafter, examples of the embodiment of the present invention are described by reference to the drawings.

Figure 1:
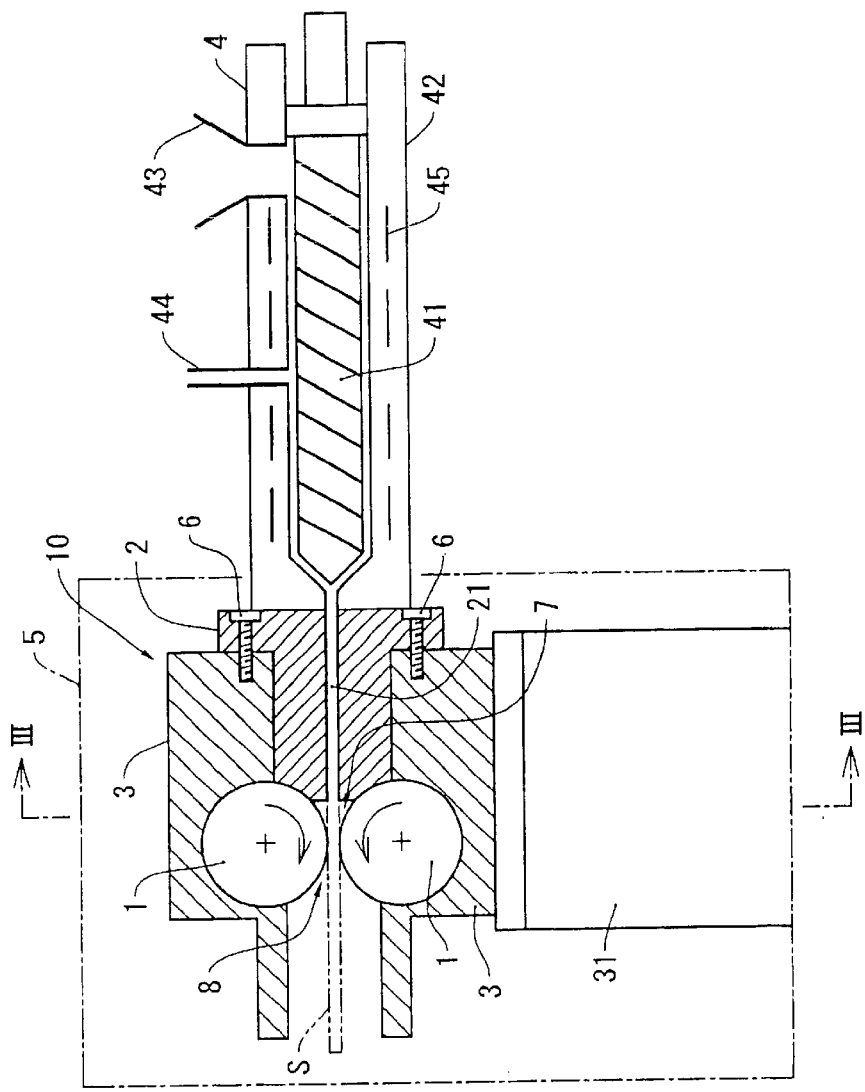
FIG. 1 is an illustration showing an outline of the whole of the extrusion molding machine in an example of the embodiment of the present invention.
Figure 2:
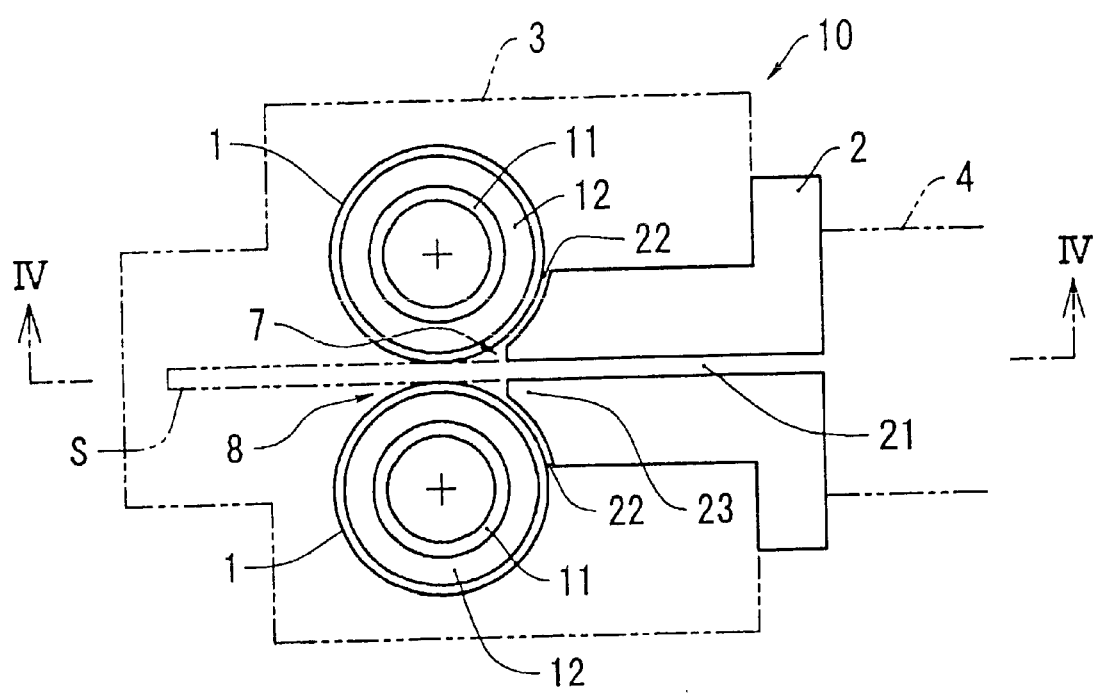
FIG. 2 is an enlargement of the extrusion molding machine in an example of the embodiment of the present invention.
Figure 3:
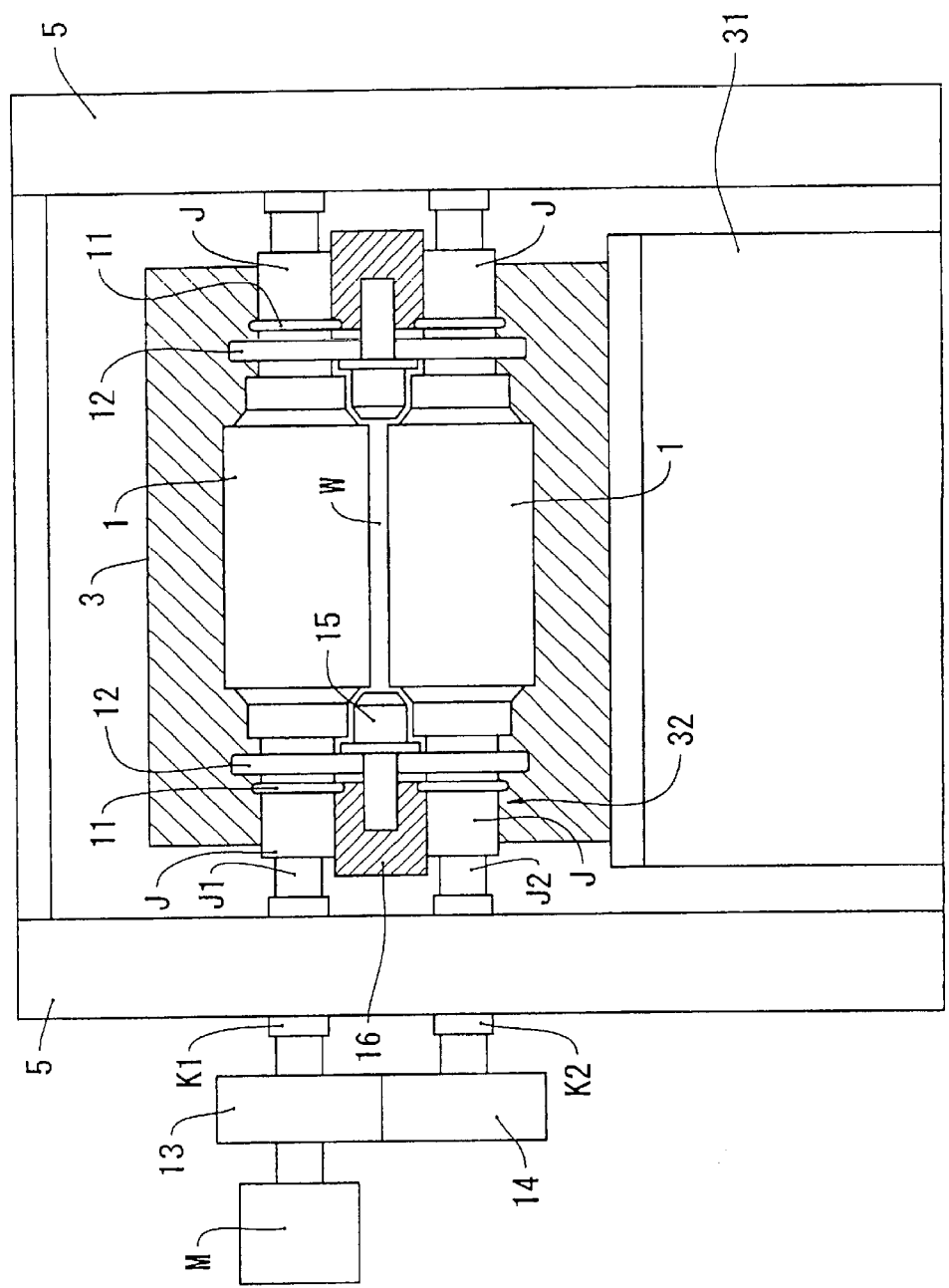
FIG. 3 is a partial sectional view of FIG. 1 along the III—III line.
Figure 4:
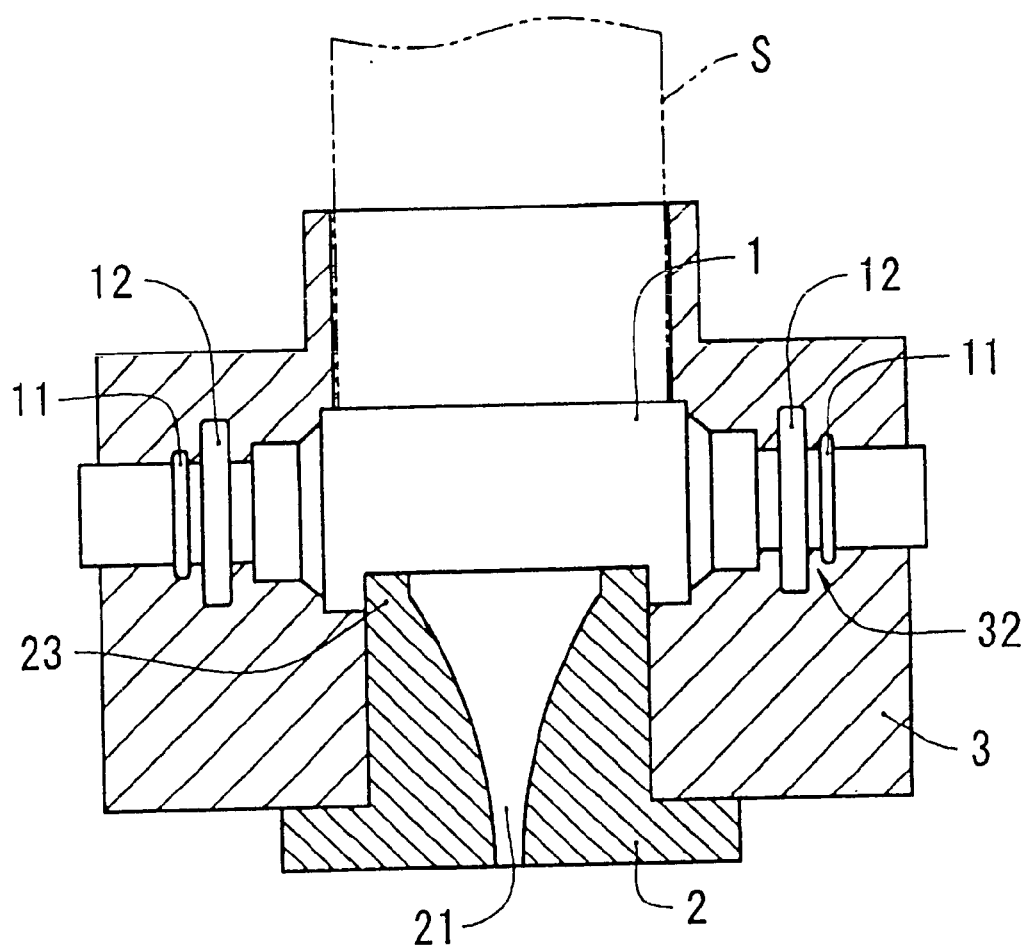
FIG. 4 is a partial sectional view of FIG. 2 along the IV—IV line.

FIGS. 1 to 4 show one example of the extrusion molding machine as the embodiment of the present invention, wherein FIG. 1 is an illustration showing an outline of the whole of the extrusion molding machine, FIG. 2 is an enlargement thereof, FIG. 3 is a partial sectional view of FIG. 1 along the III—III line, and FIG. 4 is a partial sectional view of FIG. 2 along the IV—IV line.

The extrusion molding machine in this example is used preferably in e.g. foaming molding. As shown in FIGS. 1 and 2, a molding part 10 in this extrusion molding machine is equipped with a pair of upper and lower delivery rolls 1 and a die 2 having a resin flow path 21 in it, and a pair of the delivery rolls 1 is covered vertically with, and accommodated in, gas-sealing molds 3. The die 2 is attached to the end of the extruder 4, and a molten resin material extruded from the extruder 4 is extruded through the die 2 toward the rolling part 7 between the delivery rolls 1. By rotation of a pair of the delivery rolls 1, the extruded molten resin material is rolled in the rolling part 7 between the delivery rolls 1 and delivered to the opposite side of the delivery part 8 to form a product sheet S.

The extruder 4 is equipped with a screw 41 in a cylinder 42 (see FIG. 1). A driving device not shown is connected to the rear of the screw 41, and the screw 41 is rotated by this driving device. At the time of extrusion molding, the resin material introduced via a hopper 43 over the cylinder 42 is plasticized in a molten state by heating said material with a heater 45 while rotating it with the screw 41, and then by rotating the screw 41, the molten resin material in the cylinder 42 is extruded toward the resin flow path 21 in the die 2.

As the resin material, a wide variety of thermoplastic resins and rubber materials are used, and additives such as a foaming agent and a lubricant are added as necessary depending on the intended product. For foaming molding, a vent part 44 provided on the cylinder 42 is used for injecting a carbon dioxide gas serving as a foaming agent into the cylinder 42, or used for suction of the cylinder 42 to remove water etc. contained in the resin.

The gas-sealing molds 3 are installed on a stand 31. In the gas-sealing molds 3, the upper and lower delivery rolls 1 are arranged with a slight gap thereby preventing the central rolling face thereof from contacting with the gas-sealing molds 3 (not shown in the drawings). By this constitution, the delivery rolls can be smoothly rotated. Then, the front of the gas-sealing molds 3 is open so that the product sheet S delivered by the delivery rolls 1 can be taken out, while the rear of the molds 3 is attached via e.g. a bolt 6 so that the molds 3 are intimately and externally fitted with the die 2. The die 2 is formed to be vertically thinning toward the top 23, and the top 23 is arranged in the rolling part 7 between the delivery rolls 1, to form a slight gap 22 for preventing the top 23 from contacting with the rolling face of the delivery rolls 1 (see FIG. 2). Accordingly, the rolling part 7 forms a space tightly closed by the gas-sealing molds 3 and the die 2. The gap 22 between the top 23 of the die and the rolling face is preferably such an interval as to permit the molten resin material to permeate into the gap and remain therein. By doing so, the molten resin material having permeated in the gap 22 prevents the leakage, through the gap 22, of the air and volatile components or a foaming agent etc. in foaming molding, thus further improving the air-tightness of the space in the rolling part 7.

The gap 22 is set to be not greater than 4 mm. In addition, it is preferable that the gap is set to be not greater than 3 mm. More preferred is not greater than 2 mm, further preferred is not greater than 1 mm. Setting the gap 22 between the top of the die and the rolling face of a pair of the delivery rolls to be a relatively small clearance which is not greater than 4 mm reduces the amount, being in trouble, of the molten resin material in the gap when the extrusion-forming is conducted. As a result, the smaller a clearance in the gap becomes, the more the remaining amount of the molten resin material in the gap and the turbulence of the molten resin material are reduced. Particularly in forming molding, it is possible to manufacture products with a good appearance showing no uneven distribution of foams and uniform shape of foams in the products because the turbulence of the molten resin material's streaming caused by its counter-streaming into the gap is reduced.

Furthermore, because the die 2 is thinning toward its top 23 along the rolling faces 18 of the delivery rolls, a discharge opening of the die 2 is brought near to a rolling part 1 between a pair of the delivery rolls. Due to that, the molten resin material extruded through the die 2 is immediately delivered by rotation of a pair of the delivery rolls 1, and the remaining amount, being in trouble, of the molten resin material in the gap 22 and turbulence of the molten resin material's streaming into the gap 22 caused by its counter-streaming into the gap 22 is further reduced.

As shown in FIG. 3, each of the upper and lower delivery rolls 1 is supported at both the ends by frames 5. That is, delivery roll shafts J1, J2 extending from both the ends of the delivery rolls 1 are maintained by bearings K1 and K2 attached to the frames 5, whereby a pair of the delivery rolls 1 is supported by the frames 5. A predetermined gap W is maintained between the upper and lower delivery rolls 1, 1. The gap W is regulated to have an interval in accordance with the thickness of the product sheet S delivered from the delivery rolls 1.

Further, gears 13, 14 outside of the frame 5 are attached to one end of each of the upper and lower roll shafts J1, J2, and a driving motor M is connected to the upper rotating shaft J1. By rotation of the driving motor M, the upper delivery roll 1 is rotated in the same direction as the rotation of the driving motor M, while the lower delivery roll 1 is rotated via the gear 14 in the opposite direction to the rotation of the driving motor M (See arrows in FIG. 1).

As shown in FIGS. 3 and 4, the rotating shafts J at both the ends of each of a pair of the delivery rolls 1 are externally fitted with metal O-ring 11 respectively (air-tightness keeping portion). Both the ends of each of the delivery rolls 1 between the gas-sealing molds 3 are gas-sealed by the metal O-ring 11. By this constitution, the air-tightness of the space in the rolling part 7 is improved.

Further, the rotating shafts J at both the ends of each of the delivery rolls 1 are externally fitted with Teflon packing 12 (resin packing) in the metal O-ring 11. By the Teflon packing 12, the gas sealability between the delivery roll 1 and the gas-sealing mold 3 is further improved. Further, that portion is sealed with the resin. That is, even if a part of the molten resin material penetrates into the end of the delivery rolls 1, the molten resin material is sealed by the Teflon packing 12 and prevented from leaking out of the gas-sealing molds 3.

That part of the gas-sealing mold 3 in which the rotating shaft J for delivery roll 1 has been externally fitted with the O-ring 11 and Teflon packing 12 constitutes a freely rotating part 32 to permit smooth rotation of the delivery roll 1.

At both the ends of the delivery rolls 1, top-type rollers 15 may also be present between the upper and lower delivery rolls 1. The top-type rollers 15 are supported by supporting members 16 attached to the sides of the gas-sealing molds 3, and integrated in the gas-sealing molds 3. The metal O-ring 11 externally fitted with the end of the delivery roll 1 is abutted on the supporting member 16, thus achieving the gas-sealing between the upper and lower delivery rolls 1, 1 at both the ends of the delivery rolls 1. Further, the Teflon packing 12 in the metal O-ring 11 is abutted on the top-type roller 15, thus achieving the gas- and resin-sealing between the upper and lower delivery rolls 1, 1 at both the ends of the delivery rolls 1.

The vertical height of the resin flow path 21 formed in the die 2 is constant (see FIG. 2), while the width of the path 21 is increasing toward the discharge opening of the top 23 (see FIG. 4). By this constitution, the molten resin material is extruded into a sheet form through the discharge opening between the delivery rolls so that the thickness of the product sheet S delivered from the delivery rolls 1 can be made uniform in the width direction. The width of the product sheet S is determined by the delivery roll width (see FIG. 4).

In such an extrusion molding machine, a gear pump P equipped with a pair of gears G is preferably arranged between the extruder 4 and the die 2. By providing the gear pump P, the extrusion speed and discharge of the resin are made highly uniform, and the unevenness of the thickness of the product sheet S is reduced. In particular when the pressure in the rolling part 7 between the delivery rolls 1 is increased, this constitution is effective and preferable for reducing the loading of the extruder 4.

Next, the working of the extrusion molding machine is briefly described.

Figure 5:
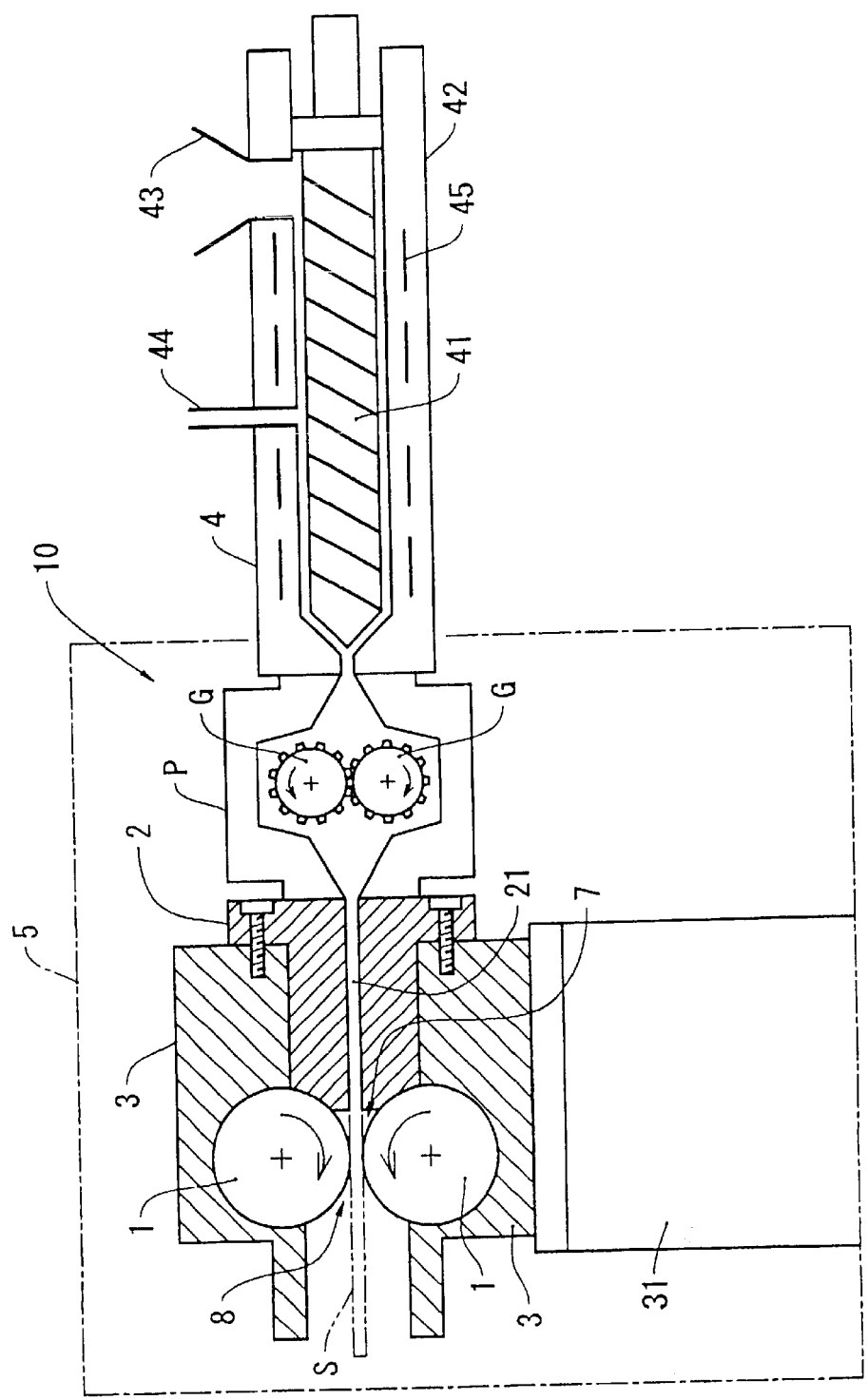
FIG. 5 is an illustration showing an example in which a gear pump was inserted into between the extruder and the die.

In the extrusion molding machine shown in FIG. 1, the screw 41 in the extruder 4 is rotated thereby extruding the molten resin material through the cylinder 42 toward the die 2. On the other hand, in the machine shown in FIG. 5, the molten resin material is extruded through the extruder 4 toward the gear pump P, and then a pair of gears G in the gear pump P is rotated at a predetermined revolution rate in the direction shown by the arrows in FIG. 5, whereby the molten resin material is extruded toward the die 2.

Then, the molten resin material is passed through the resin flow path 21 in the die 2 and extruded from the discharge opening at the end 23 to the rolling part 7 between a pair of the delivery rolls 1. Since the width of the resin flow path 21 in the die 2 is gradually increasing toward its end (see FIG. 4), the molten resin material is extruded into a sheet through the discharge opening. By the resin flow path 21 described above, the molten resin material in a sheet form is fed uniformly in the width direction to the rolling part 7.

Then, almost the molten resin material is introduced into between a pair of the delivery rolls and a part thereof is permeated into the gap 22 between the top of the die 2 and the rolling face 18 of a pair of the delivery rolls. Setting the gap 22 to be a relatively small clearance which is not greater than 4 mm reduces the remaining amount, being in trouble, of the melted resin material in the gap 22. Thereby, rotating the rolls 1 is conducted smoothly, and further turbulence of the molten resin material's streaming such as its counter-streaming into the gap 22 at the rolling part 7 is reduced. In addition, it is preferable that the gap is set to be not greater than 3 mm. More preferred is not greater than 2 mm, further preferred is not greater than 1 mm. That is to say, the smaller a clearance in the gap becomes, the more the remaining amount of the molten resin material in the gap and the turbulence of the molten resin material is reduced. Particularly in a case of a clearance which is not greater than 1 mm, the turbulence of the molten resin material is almost never observed.

Herein, the rolling part 7 is formed into a closed space by the gas-sealing molds 3 and die 2, and the rotating shafts J at both the ends of each of the delivery rolls 1 are externally fitted with the metal O-ring 11 and Teflon packing 12, thus attaining the gas-sealing between the delivery roll 1 and the gas-sealing mold 3 at the freely rotating part 32 in the gas-sealing mold 3. Further, the molten resin material permeate into the gap 22 between the end of the die 2 and the rolling face, thus preventing the leakage, through the gap 22, of the air and volatile components and in forming molding a foaming agent etc. Accordingly, the space in the rolling part 7 is rendered highly airtight. The molten resin material is extruded from the die 2 thereby reducing the leakage, from the rolling part 7, of the air and volatile components and in foaming molding a foaming agent etc., whereby the highly airtight rolling part 7 forms a high-pressure zone kept at atmospheric pressure or more. Accordingly, the molten resin material extruded from the die 2 is pressurized at atmospheric pressure or more even in the rolling part 7. The pressure in this high-pressure zone is generally about 1 to 40 MPa, preferably about 5 to 35 MPa.

By rotation of a pair of the delivery rolls 1, the molten resin material extruded toward the rolling part 7 between the delivery rolls 1 is delivered to the opposite side of the delivery part 8, to form the product sheet S. The rotation of the delivery rolls 1 by means of the driving motor M may be regulated such that the discharge of the molten resin material through the delivery rolls 1 is limited, and by doing so, the amount of the molten resin material as the bank in the rolling part 7 is increased so that the pressure of the high-pressure zone (rolling part 7) can be maintained at higher pressure.

Accordingly, the molten resin material is kept at atmospheric pressure or more until it is discharged as product sheet S from a pair of the delivery rolls 1. That is, even if the molten resin material is extruded from the die 2 to the rolling part 7 between the delivery rolls 1, the molten resin material is kept at high pressure in the rolling part 7. Accordingly, it is possible to reliably prevent the compounding ingredients in the molten resin material from being diffused out of the rolling part 7.

In the case of foaming molding, therefore, it is possible to control the diffusion, into the atmosphere, of the gas in the molten resin material in the rolling part 7, thus providing the product sheet S with a beautiful appearance in the absence of ruptured foams in the surface of the product. Further, the product sheet S with a high degree of foaming can be obtained by preventing aggregation of bubbles in the molten resin material. In addition, when a volatile lubricant is contained in the molten resin material, the lubricant as a volatile component in the rolling part 7 can be prevented from being evaporated, thus reliably releasing the product sheet S from the delivery rolls 1.

Moreover, not only the remaining amount, being in trouble, of the molten resin material in the gap 22 between the top of the die 2 and the rolling face 18 of a pair of the delivery rolls but also turbulence of the molten resin material's streaming such as its counter-streaming into the gap 22 is reduced, thereby delivery of the product S through the delivery rolls 1 is conducted smoothly without any poor appearance.

Next, another example of the extrusion molding machine as the embodiment of the present invention is described.

Figure 6:
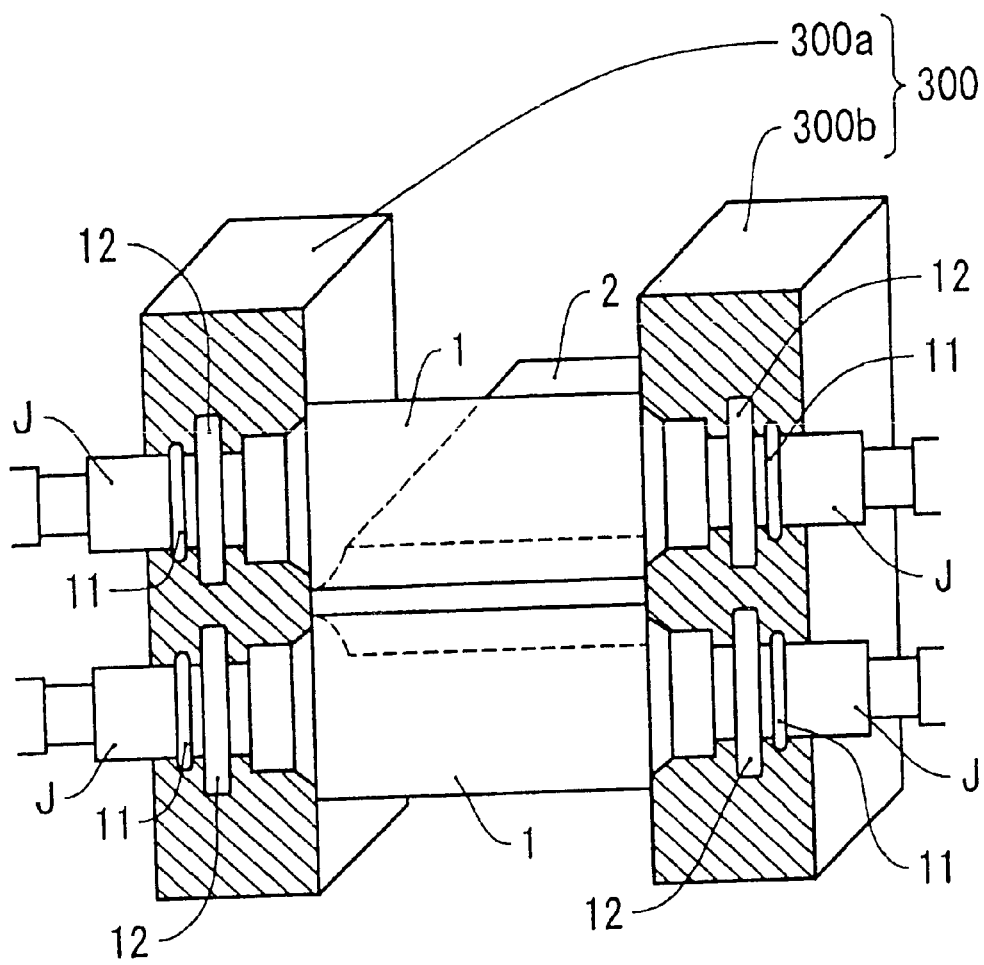
FIG. 6 is a partial sectional view showing a molding part in the extrusion molding machine in another example of the embodiment of the present invention.
Figure 7:
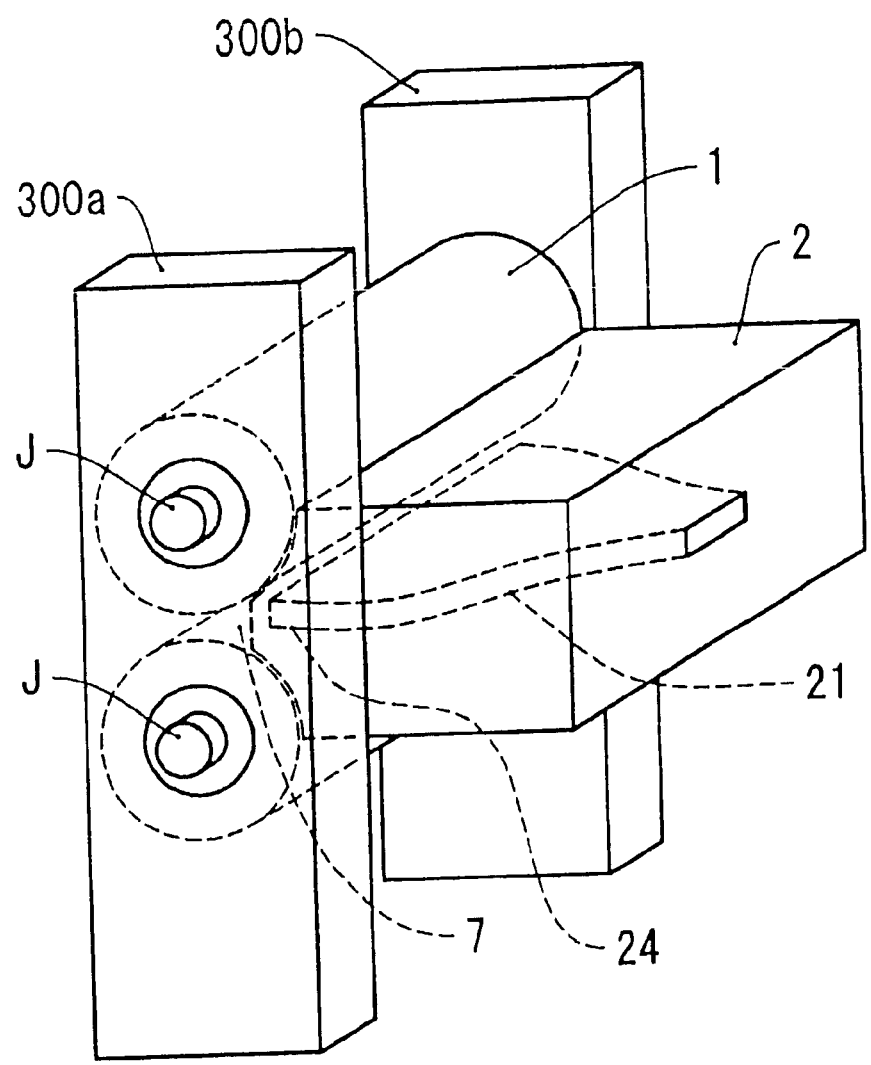
FIG. 7 is a side view of a molding part in the extrusion molding machine in another example of the embodiment of the present invention.

As shown in FIGS. 6 and 7, the extrusion molding machine in another example is constituted by a pair of right and left molds 300a, 300b arranged respectively in both the ends 24, 24 of the die 2 at the side of the discharge opening.

Figure 8:
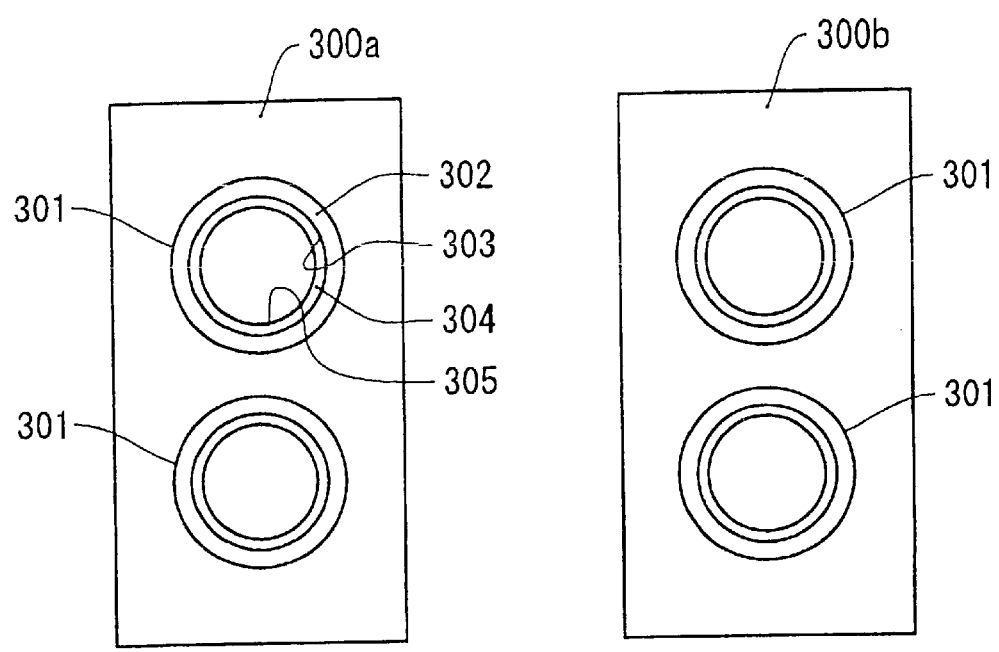
FIG. 8 is a plane view showing gas-sealing molds in the extrusion molding machine in another example.

As shown in FIG. 8, a pair of the molds 300a, 300b are provided with two holes 301 respectively, and the rotating shafts J of a pair of the delivery rolls 1, 1 are penetrated through the holes 301 and maintained to be freely rotatable therein. Further, a tapered part 302, a first perpendicular part 303, a horizontal part 304, and a second perpendicular part 305 are formed such that the internal shape of the hole 301 agrees almost with the shape of both the ends of a pair of the delivery rolls 1, 1. A pair of the molds 300a, 300b allow the rotating shafts J of a pair of the delivery rolls 1, 1 to be penetrated through the corresponding holes 301, and is joined to both the ends of the delivery rolls 1, and a pair of the molds 300a, 300b are fixed via e.g. bolts to the die 2 (not shown), and the molds are joined to both the ends 24, 24 of the die 2 at the side of the discharge opening, thus closing the openings in both sides of the rolling part 7 between a pair of the delivery rolls 1, 1. Further, the rotating shafts J at both the ends of a pair of the delivery rolls 1, 1 are externally fitted with a metal O-ring 11 and Teflon packing 12 (see FIG. 6) in the same manner as in the above-described embodiment (referred to hereinafter as the previous embodiment) shown in FIG. 1. The die 2 is also formed to be vertically thinning toward its end in an analogous manner to the previous embodiment, and the end of this die is arranged in the rolling part 7 by providing a slight gap therebetween to prevent the die from contacting with the rolling face of the delivery roll 1.

In addition, the top-type rollers 15 shown in FIG. 3 are not arranged in a case of the example described above, but the other embodiment may be constituted in the same manner as in the previous embodiment.

According to the above-described other embodiment, the gas-sealing molds 300 consisting of a pair of molds 300a, 300b are arranged in intimate contact with both the ends 24, 24 of the die 2 at the side of the discharge opening thereby closing the openings in both sides of the rolling part 7 so that the space in the rolling part between the delivery rolls 1 is closed by the gas-sealing molds 300 and the die 2. In addition, both the ends of a pair of the delivery rolls 1, 1 are joined to the holes 301 in the molds 300a, 300b, while the rotating shafts J are externally fitted with the metal O-ring 11 and Teflon packing 12, to form an air-tightness keeping part for achieving gas-sealing at both the ends of the delivery roll 1. The space in the rolling part 7 is thereby rendered highly airtight.

It follows that in the above-described other embodiment similar to the previous embodiment, the molten resin material is extruded from the die 2 to the highly airtight rolling part 7 thereby reducing the leakage, from the rolling part 7, of the air and volatile components and in foaming molding a foaming agent etc., to form a high-pressure zone kept at atmospheric pressure or more thereby demonstrating the same effect as in the previous embodiment.

The extrusion molding machine of the present invention is not limited to those embodiments described above.

For example, a pair of the delivery rolls 1, 1 not connected to the driving motor M may be freely rotated by the pressure of the molten resin material extruded from the die 2.

In addition, at least one member of the delivery rolls 1, the die 2 and the gas-sealing molds 3 has a temperature-regulating function, and preferably all of them may have a temperature-regulating function, whereby not only the viscosity of the extruded molten resin material but also the surface temperature of the molten resin material can be regulated thereby preventing disruption of foams more effectively to provide a product with a good appearance. As the temperature-regulating means, there is a method in which conventionally known means such as cooling and heating pipes through which a cooling or heating medium is circulated depending on the desired temperature are suitably arranged in e.g. the delivery roll 1, the die 2 and the gas-sealing mold 3.

Teflon packing 12 attached to the rotating shaft J of each of the delivery rolls 1, 1 may be omitted.

Further, not only various metals but resin or rubber may also be used as the material for the metal O-ring 11 as the air-tightness keeping part provided in the rotating shaft J of the delivery roll 1.

In addition, not only the Teflon packing 12 but various resin packing or rubber resin packing may also be used as the resin packing provided in the metal O-ring 11.

Also, the extrusion molding machine of the present invention may be applied to calender molding by providing it with a plurality of calender delivery rolls in the side of the delivery part 8 between a pair of the delivery rolls 1, 1.

Figure 9:
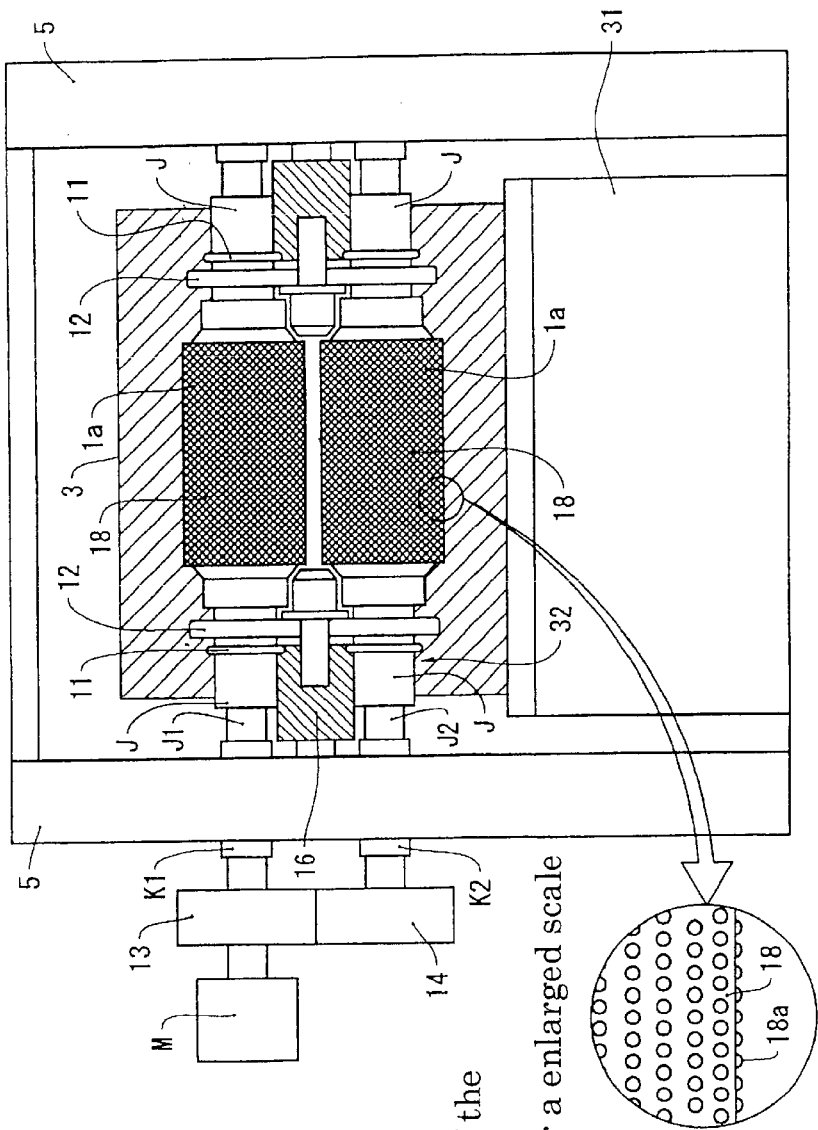
FIG. 9 is a partial sectional view showing another example of a pair of the delivery rolls of the embodiment of the present invention.

By providing e.g. a large number of small protrusions preferably semispherical protrusions 18a on the whole of the rolling faces 18 of a pair of delivery rolls 1a, 1a as shown in FIG. 9, the rolling faces 18 are made uneven such that the molten resin extruded from the die 2 is prevented from sliding on the rolling face 18 and simultaneously the surface area of the rolling faces 18 is increased to achieve more efficient cooling.

Figure 10:
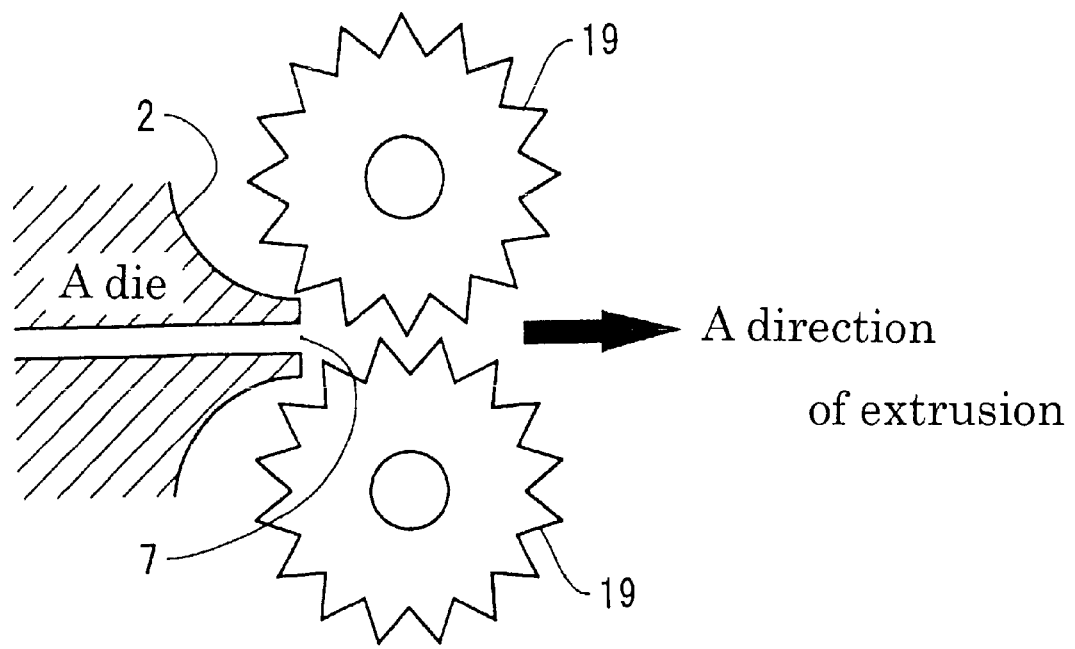
FIG. 10 is a partial sectional view showing a still other example of a pair of the delivery rolls.
Figure 11:
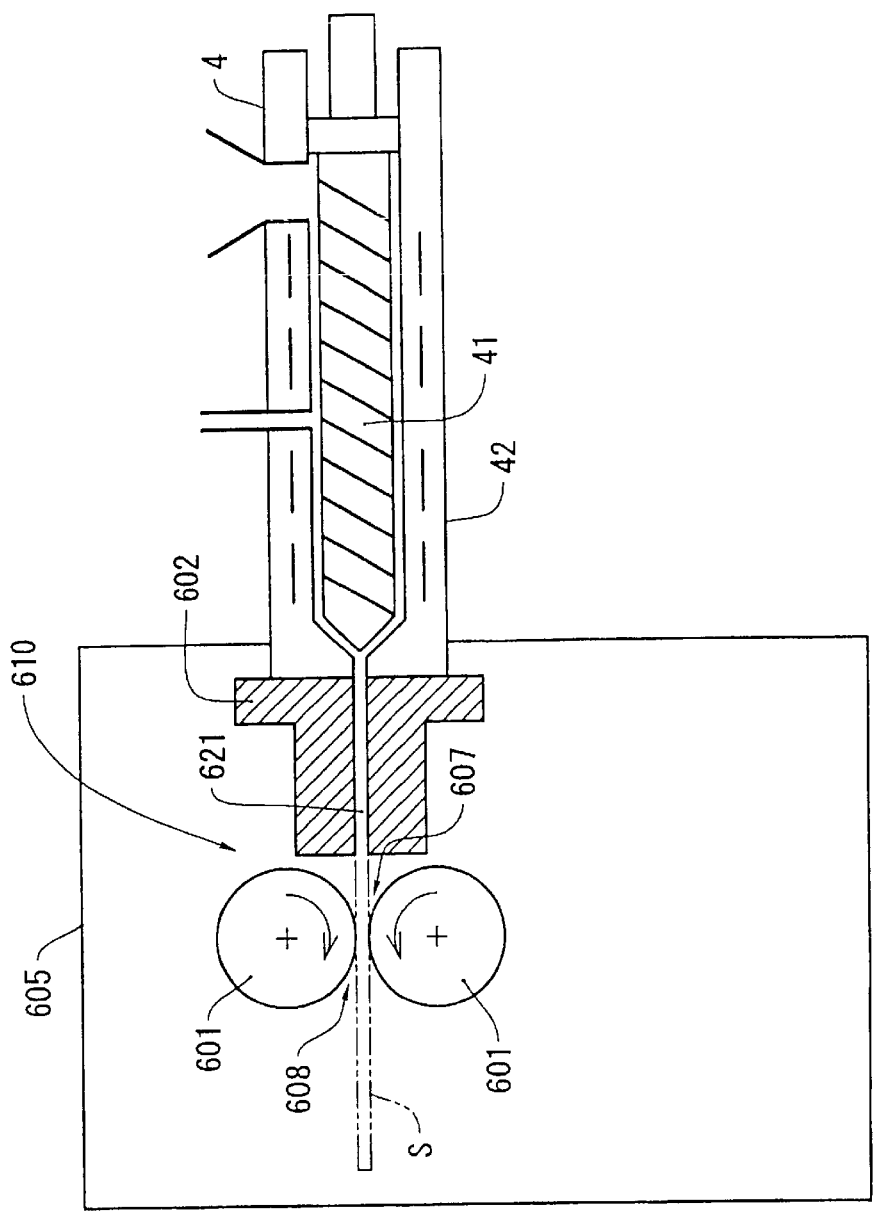
FIG. 11 is an illustration showing an outline of the whole of the conventional extrusion molding machine as a prior art.

A pair of the delivery rolls may be formed into e.g. gears to permit delivery rolls 19 to be mutually engaged as shown in FIG. 10. By permitting the delivery rolls 19 to be mutually engaged, the molten resin extruded from the die 2 can be prevented from sliding between the delivery rolls 19, and the pressure in the rolling part 7 can be regulated in a broader range.

What is claimed is:

1. A molding extrusion machine comprising a pair of delivery rolls arranged forward continuously with a die attached to the end of an extruder by which molten resin material is extruded through the die toward a rolling part between the delivery rolls and further extruded through a pair of the delivery rolls, wherein gas-sealing molds in intimate contact with both sides at least at the top of the die at the side of the discharge opening are provided to close openings in both sides of the rolling part so that supporting parts in both sides of a pair of the delivery rolls are formed into an air-tightness keeping part by said gas-sealing molds, wherein said gas-tightness keeping part is constituted by interposing an O-ring in a freely rotating part between the rotating shaft of each of the delivery rolls and the gas-sealing mold.

2. A molding extrusion machine comprising a pair of delivery rolls arranged forward continuously with a die attached to the end of an extruder by which molten resin material is extruded through the die toward a rolling part between the delivery rolls and further extruded through a pair of the delivery rolls, wherein the die is intimately and externally fitted with gas-sealing molds being open forward, a pair of the delivery rolls is accommodated in the gas-sealing molds, and supporting parts in both sides of a pair of the delivery rolls are formed into air-tightness keeping part by said gas-sealing molds, wherein said gas-tightness keeping part is constituted by interposing an O-ring in a freely rotating part between the rotating shaft of each of the delivery rolls and the gas-sealing mold.

3. The extrusion molding machine according to claim 1 or 2, wherein said gas-tightness keeping part comprises packing interposed inside of the O-ring.

4. The extrusion molding machine according to claim 1 or 2, wherein said die is thinning toward its top along the rolling faces of the delivery rolls, and the top is inserted into the rolling part with a gap therebetween to prevent the top from contacting with the rolling face.

5. The extrusion molding machine according to claim 1 or 2, wherein at least one member of the delivery roll, the die and the gas-sealing mold has a temperature-regulating function.

6. The extrusion molding machine according to claim 1 or 2, wherein a pair of the delivery rolls is delivery rolls rotated by a rotation driving means connected to at least one of the delivery rolls, and the rotation of the delivery rolls is regulated by the rotation driving means to limit the discharge, from the delivery rolls, of the molten resin material extruded through the die.

7. The extrusion molding machine according to claim 1 or 2, wherein the gap between the top of the die and the rolling face of the delivery roll is set to be an interval which permits the molten resin material extruded from the die to permeate into the gap and remain therein.

8. The extrusion molding machine according to claim 1, wherein the gap between the top of the die and the rolling face of a pair of the delivery rolls is set to be an interval which is not greater than 4 mm.

9. The extrusion molding machine according to claim 9, wherein said die is thinning toward its top along the rolling faces of the delivery rolls, and the top is inserted into the rolling part with a gap therebetween to prevent the top from contacting with the rolling face.

* * * * *